(12) United States Patent
Mizukami et al.

(10) Patent No.: US 11,124,065 B2
(45) Date of Patent: Sep. 21, 2021

(54) LEVER INPUT DEVICE

(71) Applicant: Panasonic Intellectual Property Management Co., Ltd., Osaka (JP)

(72) Inventors: Masahiro Mizukami, Fukui (JP); Ryosuke Fukumoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 119 days.

(21) Appl. No.: 16/542,301

(22) Filed: Aug. 16, 2019

(65) Prior Publication Data

US 2019/0366843 A1 Dec. 5, 2019

Related U.S. Application Data

(63) Continuation of application No. PCT/JP2018/004965, filed on Feb. 14, 2018.

(30) Foreign Application Priority Data

Feb. 24, 2017 (JP) .............................. JP2017-032893

(51) Int. Cl.
*B60K 20/02* (2006.01)
*G01B 7/00* (2006.01)
(Continued)

(52) U.S. Cl.
CPC ................ *B60K 20/02* (2013.01); *G01B 7/00* (2013.01); *G05G 9/047* (2013.01); *G05G 25/00* (2013.01);
(Continued)

(58) Field of Classification Search
CPC .......... B60K 20/02; G05G 1/04; G05G 9/047; G05G 2009/04707; G05G 2009/04755;
(Continued)

(56) References Cited

U.S. PATENT DOCUMENTS 10,711,881 B2 * 7/2020 Hessel ..................... F16H 61/22
2016/0273648 A1 * 9/2016 Kato ...................... F16H 59/105

FOREIGN PATENT DOCUMENTS

GB 190926899 A * 11/1910 ......... G05G 9/04785
JP 2008-239057 10/2008
(Continued)

OTHER PUBLICATIONS

International Search Report of PCT application No. PCT/JP2018/004965 dated May 15, 2018.

*Primary Examiner* — Adam D Rogers
(74) *Attorney, Agent, or Firm* — Seed IP Law Group LLP (57) ABSTRACT

A lever input device includes: a lever which is tiltable in a first direction orthogonal to an axis of the lever about the axis due to an operation by a user; a swing arm which engages with the lever and swings along with the tilting of the lever in the first direction and amplifies a displacement amount of the lever at the time of tilting; and a magnet body mounted on the swing arm, wherein the swing arm is elongated along a second direction which is a direction along the axis, is configured such that distance (D13) between a swing fulcrum and a mounting portion of the magnet body becomes larger than distance (D12) between the swing fulcrum of the swing arm and an engaging portion of the swing arm with the lever.

2 Claims, 6 Drawing Sheets

(51) Int. Cl.
  *G05G 9/02* (2006.01)
  *H01H 1/36* (2006.01)
  *H01H 15/06* (2006.01)
  *G05G 9/047* (2006.01)
  *G05G 25/00* (2006.01)
  *H01H 15/16* (2006.01)
  *H01H 25/04* (2006.01)

(52) U.S. Cl.
  CPC .............. *H01H 1/36* (2013.01); *H01H 15/16* (2013.01); *H01H 25/04* (2013.01); *B60Y 2400/301* (2013.01)

(58) Field of Classification Search
  CPC . G05G 25/00; G01B 7/00; H01H 1/36; H01H 15/16; H01H 25/04; B60Y 2400/301
  See application file for complete search history.

(56) References Cited

FOREIGN PATENT DOCUMENTS

| | | | |
|---|---|---|---|
| JP | 2015-093656 | | 5/2015 |
| JP | 2019188874 A | * | 10/2019 |
| WO | 2015/072267 | | 5/2015 |

\* cited by examiner

LEVER INPUT DEVICE

CROSS-REFERENCE TO RELATED APPLICATIONS

This application is a continuation of the PCT International Application No. PCT/JP2018/004965 filed on Feb. 14, 2018, which claims the benefit of foreign priority of Japanese patent application No. 2017-032893 filed on Feb. 24, 2017, the contents all of which are incorporated herein by reference.

TECHNICAL FIELD

The present invention relates to a lever input device such as a shift lever of a vehicle, for example.

BACKGROUND ART

Conventionally, a lever input device has been used as a shift device of a vehicle or the like, for example (see Patent Literature 1). A shift device disclosed in patent literature 1 includes: shift lever (24) which is tiltable in a lateral direction using select shaft (18) as an axis; and vertically elongated link (42) which swings in an interlocking manner with the shift lever. An approximately center portion of the link in the vertical direction is pivotally supported on connecting shaft (20), an upper end of the link engages with the shift lever, and rotary portion (42A) is mounted on a lower end of the shift lever. Slider (58) which has a magnet engages with the rotary portion, and printed circuit board (60) which detects the magnet is disposed below the slider.

In such a shift device, when the shift lever is tilted leftward or rightward by a user, the link swings in a lateral direction in an interlocking manner with tilting of the shift lever. The link has the construction where a displacement amount of the link is amplified in such a manner that a swing width of the rotary portion of the lower end of the link is larger than a swing width of an upper end of the link which engages with the shift lever. Accordingly, the magnet of the slider can be largely displaced by way of the rotary portion without largely operating the shift lever.

CITATION LIST

Patent Literature

PTL 1: Internal Publication No. 2015/072267

SUMMARY OF THE INVENTION

It is an object of the present invention to provide a lever input device which can be installed even in a vertically narrow space.

A lever input device according to the present invention includes: a lever which is tiltable in a first direction orthogonal to a predetermined axis about the axis due to an operation by a user; a swing arm which engages with the lever and swings along with the tilting of the lever in the first direction and also amplifies a displacement amount of the lever at the time of tilting; and a body to be detected mounted on the swing arm, wherein the swing arm is elongated along a second direction which is a direction along the axis, is configured such that a distance between a swing fulcrum and a mounting portion of the body to be detected becomes larger than a distance between the swing fulcrum of the swing arm and an engaging portion of the swing arm with the lever.

With such a configuration, for example, even in a lever input device where an axis of a lever is arranged along the vertical direction, a body to be detected can be displaced in a lateral direction with large swing width by amplifying an amount of operation of tilting the lever in the lateral direction while suppressing large-sizing of the lever input device in the vertical direction.

The lever may be tiltable also in the second direction due to an operation by a user, and may further include a slider which pivotally supports a swing fulcrum of the swing arm, and is displaceable in the second direction together with the swing arm along with the tilting of the lever in the second direction.

With such a configuration, it is possible to realize a lever input device which can perform not only an operation input in the first direction but also an operation input in the second direction orthogonal to the first direction.

According to the present invention, it is possible to provide a lever input device which can be installed even in a vertically narrow space.

DESCRIPTION OF EMBODIMENT

Before an exemplary embodiment of the present invention is described, problems of conventional devices will be briefly described. The above-mentioned lever input device disclosed in patent literature 1 is configured to include a vertically elongated link. Accordingly, a size of the entire lever input device in the vertical direction is increased. On the other hand, in the case where the lever input device is adopted as a shift device of a vehicle, for example, there exists a possibility that a sufficient arrangement space in a vertical direction cannot be ensured in a center console or the like where the shift device is disposed.

Hereinafter, a preferred exemplary embodiment of a lever input device according to the present invention is described by taking the case where a lever input device is applied to a shift device of a vehicle as an example.

(Configuration of Lever Input Device)

Figure 1:
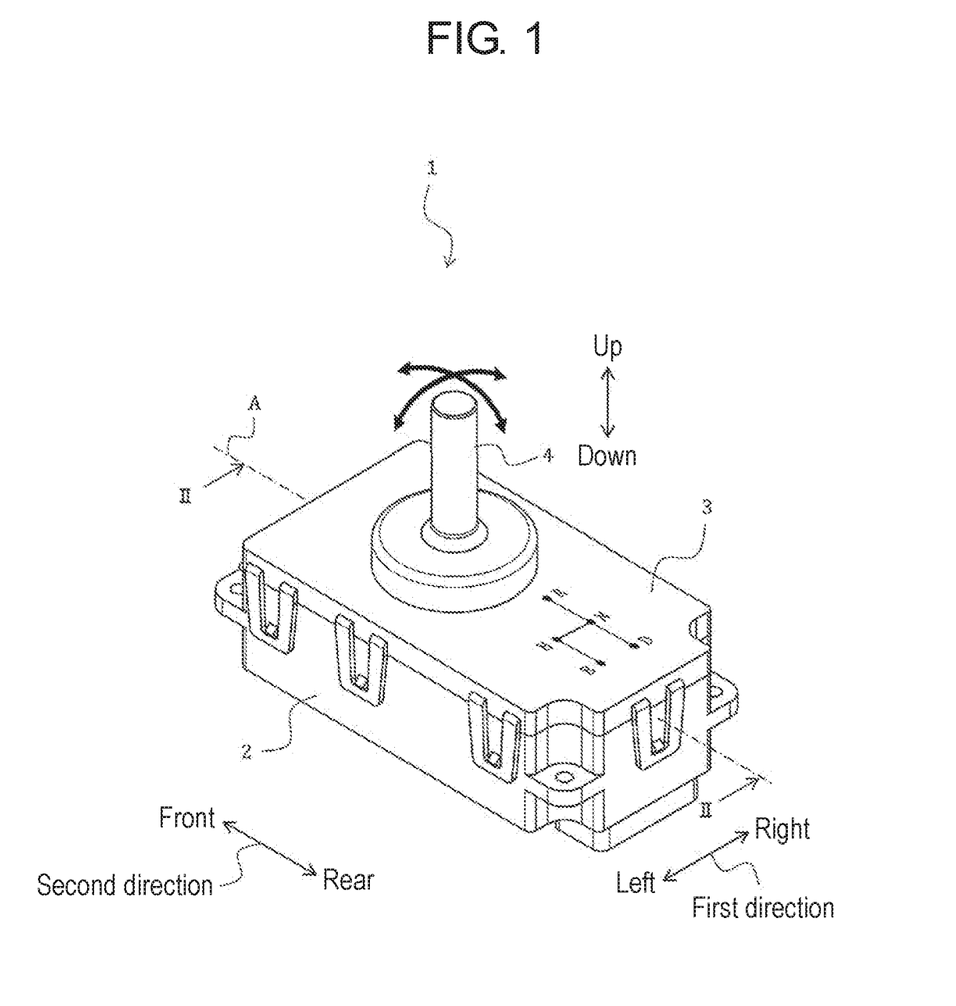
FIG. 1 is a perspective view showing an external configuration of a lever input device according to an exemplary embodiment of the present invention.

FIG. 1 is a perspective view showing an external configuration of a lever input device according to an exemplary embodiment of the present invention. As shown in FIG. 1, lever input device 1 includes: rectangular parallelepiped case 2 having an opening at an upper portion thereof; cover 3 which closes the opening of case 2; and lever 4 which elongates along a state where lever 4 penetrates cover 3.

In the description made hereinafter, a direction along short sides of case 2 having a rectangular parallelepiped shape is referred to as a lateral direction, and a direction along long sides of case 2 is referred to as a longitudinal direction. An axis of lever 4 is directed in a vertical direction.

In lever input device 1 according to the exemplary embodiment, lever 4 can be tilted and displaced in the longitudinal direction as well as in the lateral direction due to an operation by a user. FIG. 1 shows a state where lever 4 is positioned at position H (home position). The position of lever 4 can be switched between five positions including position H (see schematic view showing an upper surface of cover 3).

To describe such a configuration more specifically, lever 4 is displaceable between position H and position B (brake position) disposed behind position H, and is also displaceable between position H and position N (neutral position) disposed on a right side of position H. Lever 4 is displaceable between position N and position R (rear position) disposed in front of position N, and is also displaceable between position N and position D (drive position) disposed behind position N.

Lever 4 is configured to be tiltable in a first direction orthogonal to predetermined axis A about axis A, and is configured to be tiltable also in a second direction which is a direction along axis A. In lever input device 1 shown in FIG. 1, axis A is set along the longitudinal direction. Accordingly, the above-mentioned first direction agrees with the lateral direction, and the second direction agrees with the longitudinal direction.

Figure 2:
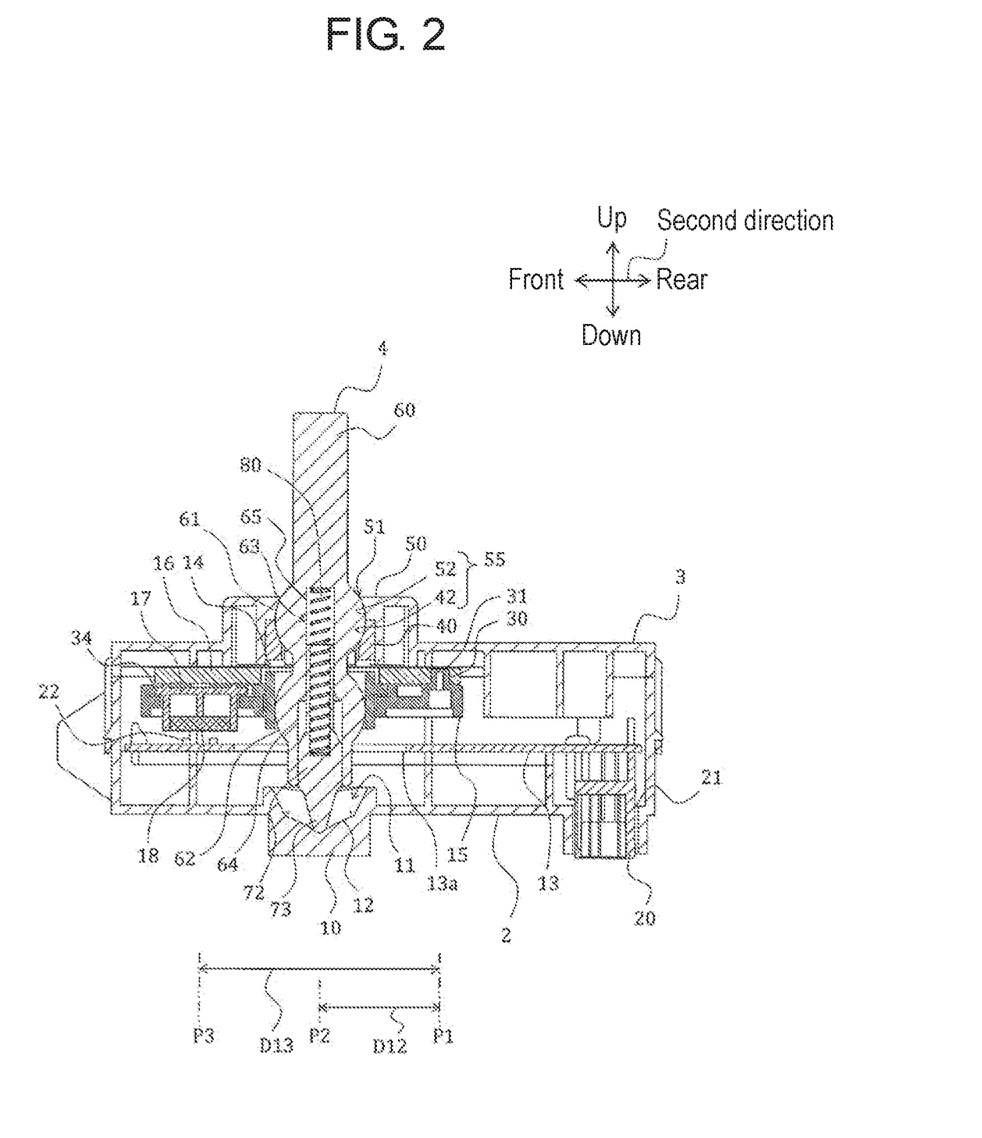
FIG. 2 is a cross-sectional view of the lever input device taken along line II-II in FIG. 1.
Figure 3:
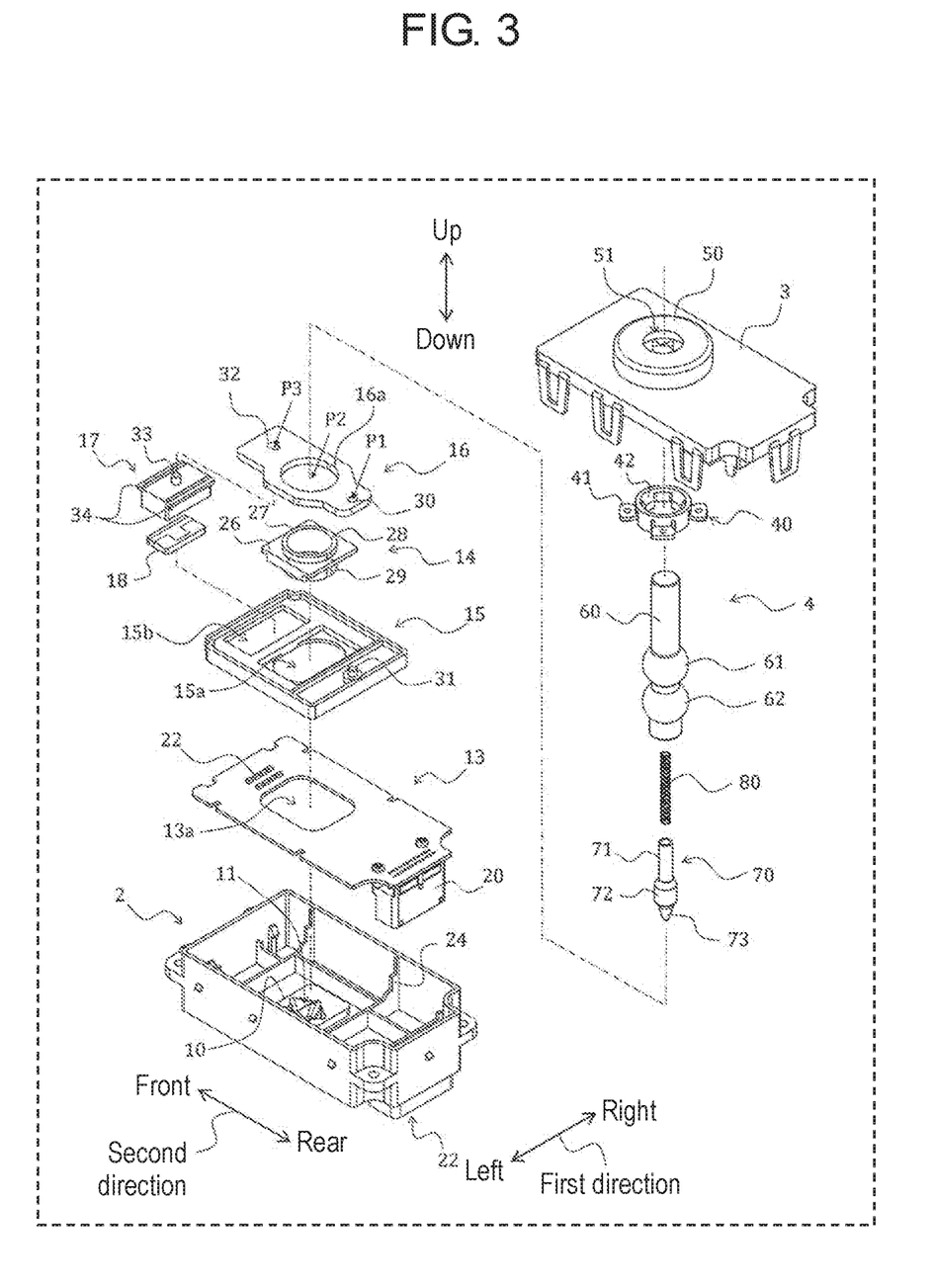
FIG. 3 is an exploded perspective view of the lever input device.

Next, the detailed configuration of lever input device 1 is described with reference to FIG. 2 and FIG. 3. FIG. 2 is a cross-sectional view of lever input device 1 taken along line II-II in FIG. 1. FIG. 3 is an exploded perspective view of lever input device 1. Line II-II in FIG. 1 agrees with axis A.

As described above, case 2 is formed in a rectangular parallelepiped shape having an upper opening, and click portion 10 is formed at an approximately center portion of a bottom portion of case 2. Click portion 10 has a block shape having a larger wall thickness than a bottom wall of case 2, and recessed portion 11 is formed on an upper surface of click portion 10. Click groove 12 elongating along the lateral direction as well as in the longitudinal direction is formed on an inner surface of recessed portion 11, and lever 4 is displaced between five positions by being guided by click groove 12.

In case 2, substrate 13, first slider 14, second slider 15, swing arm 16, magnet holder 17, and magnet body 18 which forms a body to be detected are accommodated.

Substrate 13 has a longitudinally elongated rectangular plate shape, and is fixed to case 2 while being supported by ribs which are mounted on an inner bottom portion of case 2 in an upright manner. Socket 20 is mounted on a rear lower surface of substrate 13 in a downwardly protruding manner, and socket 20 is fitted in socket hole 21 which is formed in a rear bottom wall of case 2 in a penetrating manner.

Opening 13a having a rectangular shape is formed in an approximately center portion of substrate 13, and opening 13a and click portion 10 are positioned in an overlapping manner as viewed in a plan view. A plurality of magnetic sensors 22 which function as detectors and are respectively formed of a Hall IC or the like are mounted on an upper surface of a front portion of substrate 13. The magnetic sensors 22 are electrically connected with a terminal of socket 20. In this exemplary embodiment, eight magnetic sensors 22 are provided. By connecting a group formed of predetermined four magnetic sensors 22 and another group formed of other four magnetic sensors 22 to different power source systems respectively, fail-safe can be realized.

Second slider 15 is disposed above substrate 13. Second slider 15 has a longitudinally elongated rectangular plate shape. Ribs are formed on a peripheral portion of second slider 15 in an upright manner thus imparting rigidity to second slider 15. Second slider 15 is supported at a predetermined position above substrate 13 by ribs 24 elongating from a side surface and a bottom surface in case 2. Second slider 15 is configured such that only the displacement (slide) in the longitudinal direction (second direction) is allowed, and the displacement in the lateral direction is restricted.

Elongated circular hole 15a elongated in the lateral direction is formed at an approximately center portion of second slider 15 in a penetrating manner. Elongated circular hole 15a is positioned in an overlapping manner with opening 13a formed in substrate 13 and click portion 10 described above as viewed in a plan view. Rectangular hole 15b elongated in the lateral direction is formed in a front portion of second slider 15 in a penetrating manner. Rectangular hole 15b is positioned above magnetic sensors 22 mounted on an upper surface of a front portion of substrate 13. All magnetic sensors 22 are embraced within rectangular hole 15b as viewed in a plan view.

First slider 14 engages with elongated circular hole 15a. First slider 14 is formed such that circular cylindrical member 27 is mounted in rectangular plate member 26 in a penetrating manner. Accordingly, circular cylindrical member 27 has: upper circular cylindrical portion 28 which protrudes upward from rectangular plate member 26; and lower circular cylindrical portion 29 which protrudes downward from rectangular plate member 26.

Out of upper circular cylindrical portion 28 and lower circular cylindrical portion 29, lower circular cylindrical portion 29 is fitted in elongated circular hole 15a of second slider 15 from above. With such a configuration, first slider 14 is guided by elongated circular hole 15a, and is displaceable in the lateral direction (first direction) relative to second slider 15. An outer diameter of circular cylindrical member 27 is substantially equal to an inner size of elongated circular hole 15a in the longitudinal direction. Accordingly, first slider 14 cannot be displaced in the longitudinal direction relative to second slider 15.

Swing arm 16 is disposed above first slider 14. Swing arm 16 has a longitudinally elongated plate shape, and pivotally supporting hole 30 having a circular shape is formed in a rear portion of swing arm 16 in a vertically penetrating manner. Pivot shaft 31 which is mounted on an upper surface of a rear portion of second slider 15 in an upright manner is inserted into pivotally supporting hole 30. With such a configuration, a front portion of swing arm 16 is swingable in the lateral direction about pivot shaft 31.

Elongated circular hole 16a (second engaging portion) elongated in the longitudinal direction is formed at an approximately center portion of swing arm 16 in a penetrating manner. Further, upper circular cylindrical portion 28 of first slider 14 engages with elongated circular hole 16a such that upper circular cylindrical portion 28 is fitted in elongated circular hole 16a from below. With such a configuration, when first slider 14 is displaced in the lateral direction in elongated circular hole 15a of second slider 15, swing arm 16 swings in the lateral direction about pivot shaft 31 by way of upper circular cylindrical portion 28 and elongated circular hole 16a along with the displacement of first slider 14.

Supporting hole 32 (third engaging portion) formed of an elongated hole elongated in the longitudinal direction is formed in a front portion of swing arm 16. On the other hand, magnet holder 17 for holding magnet body 18 is disposed below the front portion of swing arm 16. Magnet holder 17 has a laterally elongated rectangular parallelepiped shape, and shaft portion 33 is formed on an upper center portion of magnet holder 17 in a protruding manner. By inserting shaft portion 33 in supporting hole 32 of swing arm 16 from below, magnet holder 17 is supported on the front portion of swing arm 16.

Magnet holder 17 has flanges 34 which are respectively elongates on a front side and a rear side of the magnet holder 17 in a raised manner from an upper portion of magnet holder 17. Magnet holder 17 is positioned such that magnet holder 17 is fitted in rectangular hole 15b formed in the front portion of second slider 15. In such a configuration, flanges 34 are brought into contact with portions of second slider 15 which define a front side and a rear side of rectangular hole 15b from above. That is, magnet holder 17 is fitted in rectangular hole 15b while being placed on second slider 15 by flanges 34.

A size of the rectangular hole 15b in the longitudinal direction is substantially equal to a size of magnet holder 17 in the longitudinal direction. On the other hand, a size of the rectangular hole 15b in the lateral direction is larger than a size of magnet holder 17 in the lateral direction. Accordingly, when swing arm 16 swings in the lateral direction, magnet holder 17 is displaced in the lateral direction by being guided by rectangular hole 15b. Positional displacement (displacement of a posture) of magnet holder 17 in the longitudinal direction is restricted by rectangular hole 15b.

Magnet body 18 held by magnet holder 17 is positioned so as to opposedly face magnetic sensors 22 mounted on the upper surface of the front portion of substrate 13 from above. Magnetic sensor 22 according to this exemplary embodiment is formed so as to detect an S pole, for example. In this case, magnet body 18 is formed such that a predetermined region of a lower surface of magnet body 18 forms the S pole.

On the other hand, lever 4 is supported on cover 3 of lever input device 1 by way of bearing 40.

To describe specifically, cover 3 has a longitudinally elongated rectangular shape, and boss portion 50 which protrudes upward is formed on an approximately center portion of cover 3. Through hole 51 elongating along the vertical direction is formed in boss portion 50, and an inner surface of through hole 51 forms upper bearing surface 52 having a spherical shape.

Bearing 40 is mounted on cover 3 by a fastening means such as screws from below. Bearing 40 has an approximately circular cylindrical shape and has an axis thereof directed in the vertical direction. Flanges 41 for connecting bearing 40 to the lower surface of cover 3 by way of screws or the like are formed on an outer peripheral portion of a lower end of bearing 40 in a protruding manner. An inner surface of bearing 40 forms lower bearing surface 42 having a spherical shape.

With such a configuration, when bearing 40 is mounted on cover 3, an upper end of lower bearing surface 42 of bearing 40 and a lower end of upper bearing surface 52 of boss portion 50 of cover 3 are connected to each other. As a result, spherical bearing surface 55 having a large area is formed by lower bearing surface 42 and upper bearing surface 52.

Lever 4 has a rod shape having an axis thereof elongating along the vertical direction, and an upper portion of lever 4 forms operation portion 60 which is grippable by a user. A spherical body is formed at two portions of lever 4, that is, a center portion and a lower portion of lever 4 respectively. The spherical body formed on the center portion forms pivotally supported spherical body 61 which functions as a pivotally supported portion which is supported by bearing surface 55. That is, an upper portion of pivotally supported spherical body 61 is supported by upper bearing surface 52, and a lower portion of the pivotally supported spherical body 61 is supported by lower bearing surface 42. With such a configuration, lever 4 can be displaced in a tiltable manner within a support range including the longitudinal direction and the lateral direction using a center of pivotally supported spherical body 61 as a fixing point (tilting fulcrum).

The spherical body mounted on a lower portion of lever 4 forms engaging spherical body 62 which functions as an engaging portion (first engaging portion) which engages with first slider 14. That is, an inner diameter of circular cylindrical member 27 of first slider 14 is substantially equal to an outer diameter of engaging spherical body 62, and engaging spherical body 62 engages with circular cylindrical member 27 such that engaging spherical body 62 is fitted in circular cylindrical member 27. As described previously, circular cylindrical portion 27 of first slider 14 is fitted in elongated circular hole 16a (second engaging hole) of swing arm 16 from below. That is, engaging portion (first engaging portion) of lever 4, circular cylindrical member 27 of first slider 14, and elongated circular hole 16a (second engaging portion) of swing arm 16 engage with each other.

Pin accommodating hole 63 which elongates along an axis of lever 4 and opens at a lower end of lever 4 is formed in a lower portion of lever 4. With respect to pin accommodating hole 63, lower portion hole 64 formed close to an opening of pin accommodating hole 63 and upper portion hole 65 positioned on a deep side of pin accommodating hole 63 differ from each other in inner diameter. That is, lower portion hole 64 has a larger diameter than upper portion hole 65. In such pin accommodating hole 63, click pin 70 and click spring 80 which biases click pin 70 downward are accommodated.

An upper portion of click pin 70 forms cylindrical portion 71 which has an upper portion having a cylindrical shape, and an outer diameter of cylindrical portion 71 is substantially equal to an inner diameter of upper portion hole 65 of pin accommodating hole 63. Cylindrical portion 71 of click pin 70 is inserted into upper portion hole 65 of pin accommodating hole 63, and an inner space of cylindrical portion 71 and an inner space of upper portion hole 65 are communicated with each other thus forming an integral space. In such a space, coil-shaped click spring 80 elongated in an axial direction is accommodated.

Circular columnar large diameter portion 72 whose outer diameter is enlarged compared to an outer diameter of cylindrical portion 71 is coaxially connected to a lower side of cylindrical portion 71 of click pin 70. Pin tip 73 having a vertically inverted conical shape is connected to a lower side of large diameter portion 72. A lower end portion of pin tip 73 is brought into contact with click groove 12 formed on recessed portion 11 of click portion 10 from above. With such a configuration, the lower end portion of click pin 70 is guided by click groove 12 using the center of pivotally supported spherical body 61 as a fixing point and hence, lever 4 can be displaced in the longitudinal direction as well as in the lateral direction.

In lever input device 1 described above, when lever 4 is operated in the "lateral direction", such displacement of lever 4 is transmitted to magnet holder 17 by way of first slider 14 and swing arm 16, and magnet body 18 held by magnet holder 17 is also displaced in the lateral direction.

Pivotally supporting hole 30 formed in the rear portion of swing arm 16 is supported by pivot shaft 31 thus forming fulcrum P1 at the time of swinging. First elongated circular hole 16a at a center portion of swing arm 16 is a portion which engages with lever 4, and is a portion to which displacement of lever 4 is transmitted, and forms force point P2 at the time of swinging. Supporting hole 32 (third engaging portion) formed in the front portion of swing arm 16 is a portion which supports magnet body 18 by way of magnet holder 17. That is, supporting hole 32 is a portion where magnet body 18 which is displaced at the time of swinging is disposed, and forms action point P3 at the time of swinging.

As can be understood from FIG. 3, in lever input device 1, fulcrum P1, force point P2, and action point P3 of swing arm 16 are positioned in a spaced-apart manner from each other in the longitudinal direction (second direction) orthogonal to an axis of lever 4. Further, as shown in FIG. 2, distance D13 from fulcrum P1 to action point P3 is set larger than distance D12 from fulcrum P1 to force point P2. Accordingly, a tilting operation amount in the lateral direction of lever 4 can be amplified while suppressing large-sizing of lever input device 1 in the vertical direction, and magnet body 18 can be displaced in the lateral direction with a large swing width.

In this lever input device 1, when lever 4 is operated in the "longitudinal direction", swing arm 16 which supports magnet body 18 is displaceable in the longitudinal direction together with second slider 15. Accordingly, as described above, magnet body 18 can be displaced in the lateral direction by amplifying a tilting operation amount of lever 4 in the "lateral direction" and, at the same time, magnet body 18 can be displaced in the longitudinal direction by transmitting also tilting operation of lever 4 to the magnet body 18 in the "longitudinal direction".

(Manner of Operation of Lever Input Device)

Next, the manner of operation of lever input device 1 is described. In lever input device 1, when operation portion 60 formed on the upper portion of lever 4 is operated, lever 4 is tilted about pivotally supported spherical body 61. In such an operation, since pin tip 73 is guided along click groove 12, an operation direction of lever 4 is restricted in the predetermined directions, that is, the longitudinal direction and the lateral direction.

When lever 4 is tilted in the lateral direction, engaging spherical body 62 formed on the lower portion of lever 4 is displaced in the lateral direction, and first slider 14 which engages with engaging spherical body 62 is also displaced in the lateral direction. Along with such an operation, swing arm 16 which engages with first slider 14 by way of elongated circular hole 16a swings in the lateral direction using pivotally supporting hole 30 as a fulcrum.

As described above, with respect to swing arm 16, fulcrum P1 (pivotally supporting hole 30), force point P2 (first elongated circular hole 16a), and action point P3 (supporting hole 32) are arranged in this order from a rear side to a front side, and distance D13 from fulcrum P1 to action point P3 is set larger than distance D12 from fulcrum P1 to force point P2. Accordingly, a displacement amount of action point P3 of swing arm 16 is increased compared to a displacement amount of force point P2 of swing arm 16 and hence, magnet body 18 supported on the front portion of swing arm 16 is largely displaced in the lateral direction.

When lever 4 is tilted in the longitudinal direction, engaging spherical body 62 formed on the lower portion of lever 4 is displaced in the longitudinal direction, and first slider 14 which engages with engaging spherical body 62 is also displaced in the longitudinal direction. Along with such a displacement, second slider 15 which engages with first slider 14 by way of elongated circular hole 15a, and swing arm 16 which is connected to second slider 15 by way of pivot shaft 31 and pivotally supporting hole 30 are also displaced in the longitudinal direction. As a result, magnet body 18 supported on the front portion of swing arm 16 is displaced in the longitudinal direction.

When the position of magnet body 18 is changed along with the above-mentioned tilting operation of lever 4, out of the plurality of magnetic sensors 22 mounted on substrate 13, a combination of magnet body 18 and magnetic sensor 22 which opposedly faces magnet body 18 is changed. Accordingly, it is possible to determine the position of lever 4 based on an output signal of magnetic sensor 22.

Figure 4:
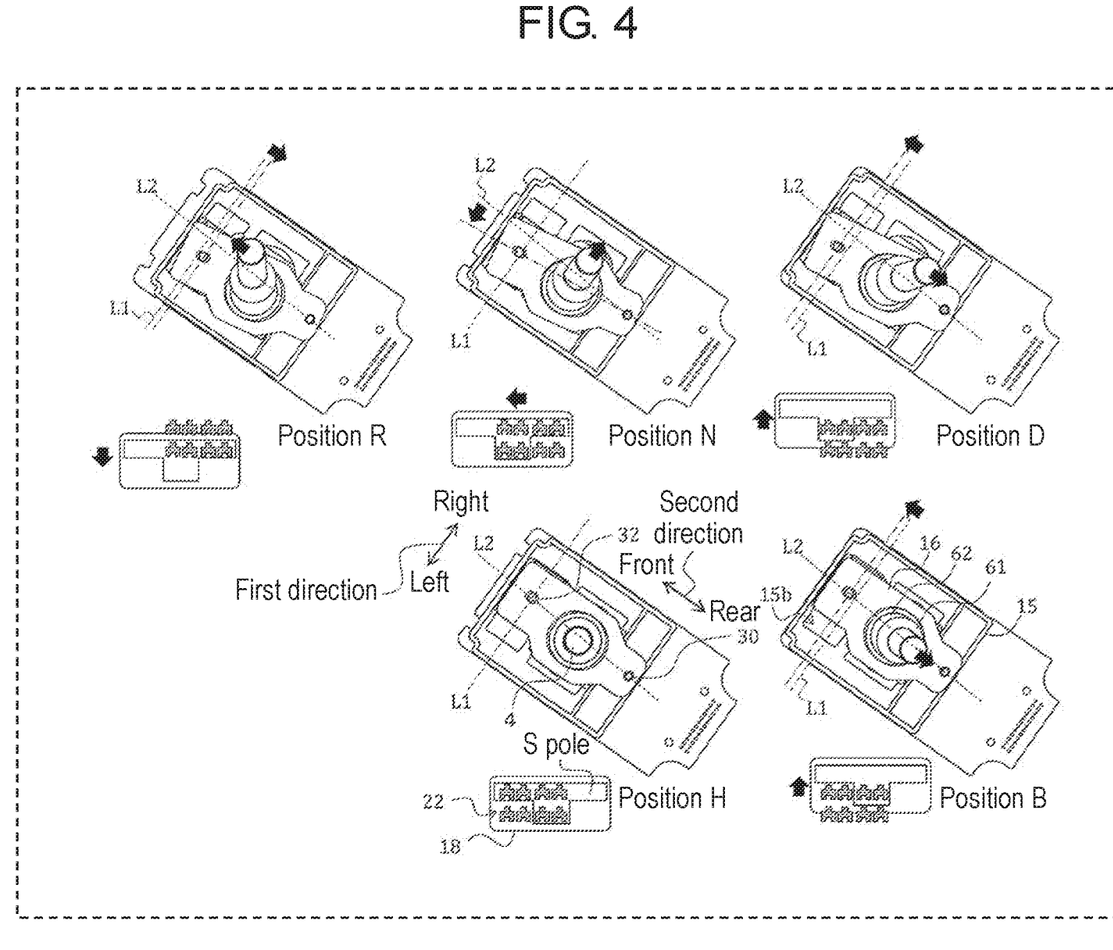
FIG. 4 is a plan view showing the manner of operation of the lever input device.
Figure 5:
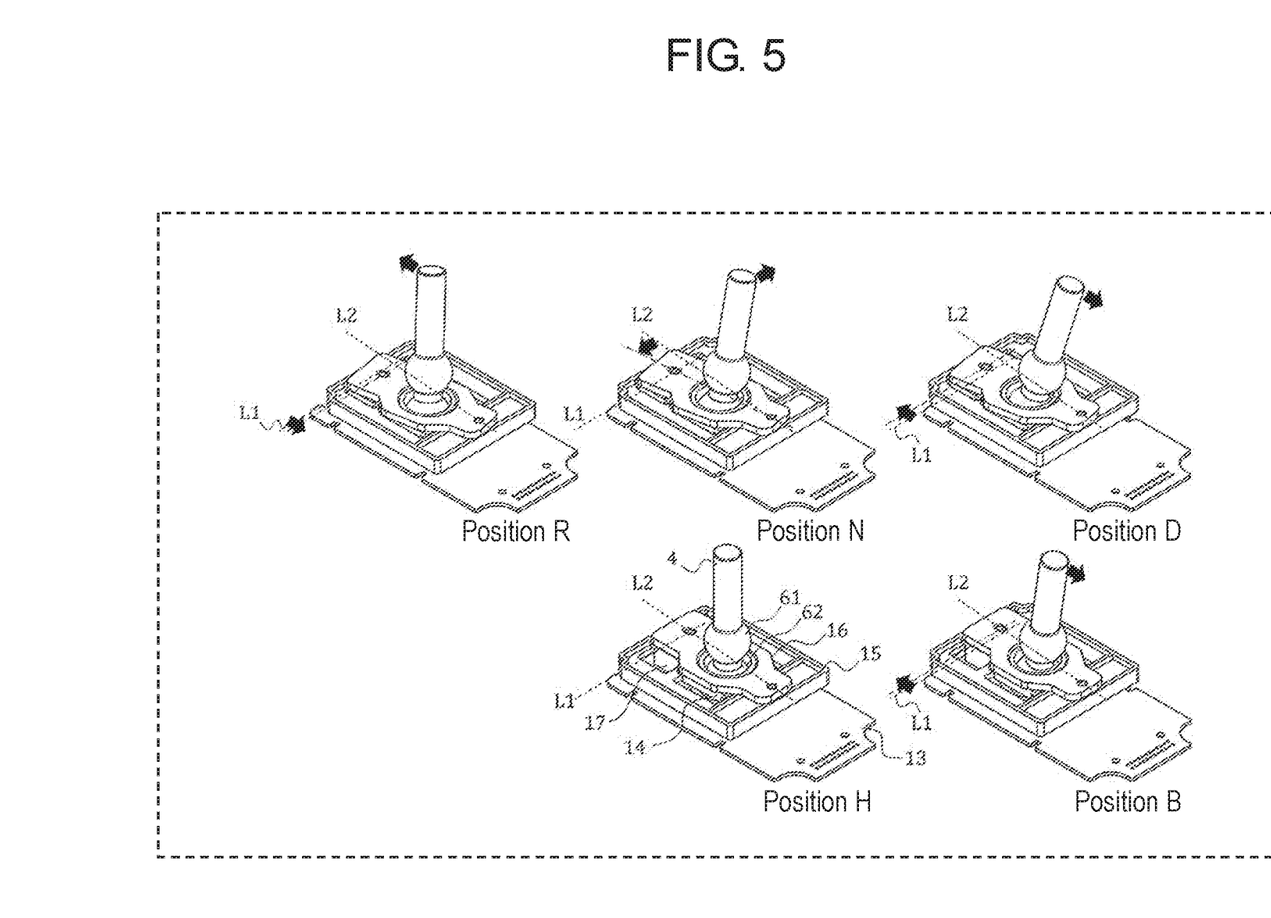
FIG. 5 is a perspective view showing the manner of operation of the lever input device.

Next, the manner of operation of lever input device 1 when lever 4 is operated in a tiltable manner between five positions is described in detail. FIG. 4 is a plan view showing the manner of operation of lever input device 1, and FIG. 5 is a perspective view showing the manner of operation of lever input device 1. In both FIG. 4 and FIG. 5, case 2 and cover 3 are not shown for facilitating the understanding of the manner of operation of lever input device 1. FIG. 4 also shows the relative positional relationship between the S pole region of magnet body 18 and magnetic sensor 22 at respective positions.

(Position H)

When lever 4 is at position H, in lever input device 1, pin tip 73 is positioned at a center deepest portion (detent center) of recessed portion 11 of click portion 10 as shown in FIG. 2, and lever 4 is in a posture where lever 4 is arranged along the vertical direction. In the description made hereinafter, the state where lever input device 1 takes position H is used as the reference. For facilitating the comparison between the state where lever input device 1 takes position H and the states where lever input device 1 is at other positions, imaginary lines L1, L2 indicating the posture of lever input device 1 when lever input device 1 takes position H are set. Imaginary line L1 is a line which passes a position where magnet body 18 is supported (supporting hole 32 of swing arm 16) and elongates along the lateral direction. Imaginary line L2 is a line which connects a swing fulcrum of swing arm 16 (pivotally supporting hole 30) and the position where magnet body 18 is supported (supporting hole 32) to each other.

(Position B)

Lever 4 at position H is switched to position B by operating operation portion 60 rearward. In such an operation, engaging spherical body 62 of lever 4 is displaced frontward about pivotally supported spherical body 61, and second slider 15 and swing arm 16 which is pivotally supported on second slider 15 are also displaced frontward along with the displacement of engaging spherical body 62. As a result, magnet body 18 supported on swing arm 16 is displaced frontward from the state where lever 4 is at position H and hence, the position of magnet body 18 relative to magnetic sensors 22 is changed.

When the reverse operation is performed, that is, when lever 4 is switched to position H from position B, the manner of operation of lever input device 1 is reversed from the above-mentioned manner of operation. The same goes for switching operation between other positions described hereinafter.

(Position N)

Lever 4 at position H is switched to position N by operating operation portion 60 rightward. In such an operation, engaging spherical body 62 of lever 4 is displaced leftward about pivotally supported spherical body 61, and swing arm 16 also swings leftward along with the displacement of engaging spherical body 62 using pivotally supporting hole 30 as fulcrum P1. As a result, magnet body 18 supported on swing arm 16 is displaced leftward from a state where lever 4 is at position H and hence, the position of magnet body 18 relative to magnetic sensors 22 is changed.

(Position D)

Lever 4 at position N is switched to position D by operating operation portion 60 rearward. In such an operation, engaging spherical body 62 of lever 4 is displaced frontward about pivotally supported spherical body 61, and second slider 15 and swing arm 16 which is pivotally supported on second slider 15 are also displaced frontward along with the displacement of engaging spherical body 62. As a result, magnet body 18 supported on swing arm 16 is displaced frontward from the state where lever 4 is at position N and hence, the position of magnet body 18 relative to magnetic sensors 22 is changed.

(Position R)

Lever 4 at position N is switched to position R by operating operation portion 60 frontward. In such an operation, engaging spherical body 62 of lever 4 is displaced rearward about pivotally supported spherical body 61, and second slider 15 and swing arm 16 which is pivotally supported on second slider 15 are also displaced rearward along with the displacement of engaging spherical body 62. As a result, magnet body 18 supported on swing arm 16 is displaced rearward from the state where lever 4 is at position N and hence, the position of magnet body 18 relative to magnetic sensors 22 is changed.

When the position of lever 4 is switched between five positions as described above, the position of magnet body 18 relative to magnetic sensors 22 is changed along with the switching. Further, a combination of output signals from magnetic sensors 22 (that is, a combination of magnetic sensors 22 which detect an S pole) differs between the respective positions. Accordingly, it is possible to determine the position of lever 4 based on output signals from magnetic sensors 22.

In the description made heretofore, the case is described where the position of lever 4 is switched between five positions as an example. However, for example, the lever input device may be configured such that the position of lever 4 is switched between six positions by adding another position to the above-mentioned five positions by further operating lever 4 frontward in the second direction from position H.

In the lever input device of the present invention, the number of positions between which lever 4 is switchable is not limited to five positions or six positions, and the lever input device of the present invention can be realized even when the number of positions between which lever 4 is switchable is set to two to four positions or seven positions or more.

According to lever input device 1 described heretofore, magnet body 18 can be displaced in the lateral direction with a large swing width by amplifying an operation amount that lever 4 is tilted in the first direction while suppressing large-sizing of the lever input device 1 in the direction along an axis of lever 4. Further, it is possible to realize lever input device 1 which can perform not only an inputting operation applied to lever 4 in the first direction but also an inputting operation applied to lever 4 in the second direction orthogonal to the first direction.

Figure 6:
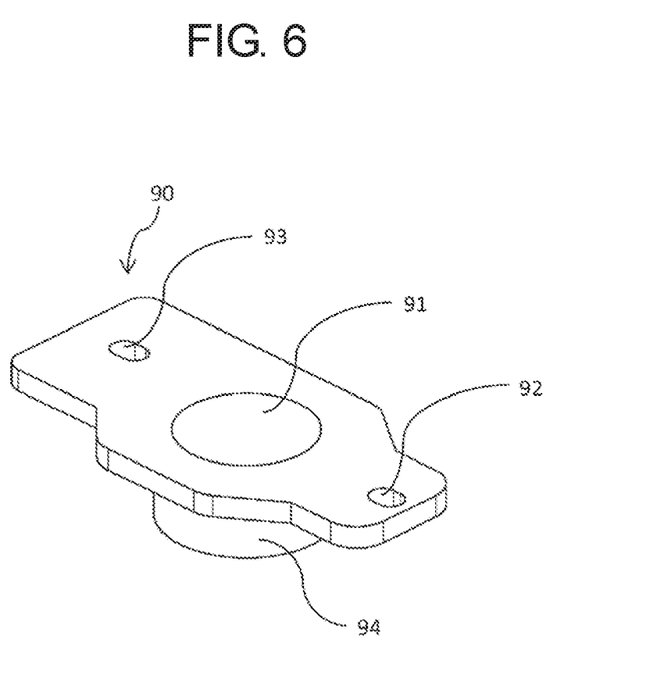
FIG. 6 is a perspective view of a main part of a lever input device according to a modification.

The configuration described in the above-mentioned exemplary embodiment is one example, and may be suitably changed. For example, in lever input device 1, the description has been made with respect to the case where swing arm 16 includes first elongated circular hole 16a and pivotally supporting hole 30 having a circular shape. However, first elongated circular hole 16a may be formed into a circular hole and may engage with upper circular cylindrical portion 28 of first slider 14 by fitting engagement, and pivotally supporting hole 30 may be formed into a longitudinally elongated circular hole. To be more specific, as shown in FIG. 6 which is a perspective view showing a main part of lever input device 1, swing arm 90 may be formed as an integral body formed of a swing arm and a first slider. Swing arm 90 includes: first circular hole 91 having a circular shape and disposed at an approximately center portion of swing arm 90; supporting hole 93 having a longitudinally elongated circular shape and disposed on a front portion of swing arm 90; pivotally supporting hole 92 having a longitudinally elongated circular shape and disposed on a rear portion of swing arm 90; and lower circular cylindrical portion 94. Lower circular cylindrical portion 94 of the swing arm 90 is guided by elongated circular hole 15a and hence, slide arm 90 is displaceable in the lateral direction (first direction) with respect to second slider 15. Accordingly, swing arm 90 cannot be relatively displaced in the longitudinal direction with respect to second slider 15. Accordingly, when swing arm 90 is displaced in the lateral direction in elongated circular hole 15a of second slider 15, swing arm 90 swings in the lateral direction about pivot shaft 31 by way of first circular hole 91 along with the displacement of swing arm 90.

With respect to the configuration for amplifying an operation amount of lever 4, the configuration for amplifying an operation amount of lever 4 in the lateral direction has been described above. In place of the above-mentioned configuration or in addition to the above-mentioned configuration, the configuration may be adopted where an operation amount of lever 4 in the longitudinal direction is amplified.

In the above-mentioned exemplary embodiment, with respect to the configuration of swing arm 16, the configuration has been described where fulcrum P1, force point P2 and action point P3 are arranged in this order. However, the configuration of swing arm 16 is not limited to such a configuration. For example, the configuration may be adopted where fulcrum P1, force point P2, and action point P3 are arranged such that fulcrum P1 is sandwiched between force point P2 and action point P3, and a distance from fulcrum P1 to action point P3 is set larger than a distance from fulcrum P1 to force point P2.

In the above description, the case is exemplified where magnetic sensors 22 are used as the detectors for detecting an operation of lever 4. However, the present invention is not limited to such a case. For example, the detector may be formed of a contact sensor that detects the presence or non-presence of a physical contact or an optical sensor that detects the presence or non-presence of light reception. Further, sensors which use other methods may be adopted.

INDUSTRIAL APPLICABILITY

The present invention is applicable to a lever input device such as a shift lever of a vehicle, for example.

REFERENCE MARKS IN THE DRAWINGS

1: lever input device
2: case
3: cover
4: lever
10: click portion
11: recessed portion
12: click groove
13: substrate
13a: opening
15a: elongated circular hole
15b: rectangular hole
16a: elongated circular hole
14: first slider
15: second slider
16, 90: swing arm
17: magnet holder
18: magnet body (body to be detected)
22: magnetic sensor (detector)
20: socket
21: socket hole
24: rib
26: rectangular plate member
27: circular cylindrical member
28: upper circular cylindrical portion
29: lower circular cylindrical portion
30: pivotally supporting hole
31: pivot shaft
32: supporting hole
33: shaft portion
34: flange
41: flange
50: boss portion
51: through hole
60: operation portion
61: pivotally supported spherical body
62: engaging spherical body
63: pin accommodating hole
64: lower portion hole
65: upper portion hole
70: click pin
71: cylindrical portion
72: large diameter portion
73: pin tip
80: click spring
91: circular hole
92: pivotally supporting hole
93: supporting hole
94: lower circular cylindrical portion
P1: fulcrum
P2: force point
P3: action point

The invention claimed is:

1. A lever input device comprising:
a lever including an operation portion and a first engaging portion;
a swing arm including a swing fulcrum, a second engaging portion, and a third engaging portion, the swing arm engaging with the first engaging portion of the lever at the second engaging portion;
a body to be detected engaging with the swing arm at the third engaging portion of the swing arm;
a detector arranged so as to opposedly face the body to be detected; and
a slider,
wherein the lever is tiltable in a first direction along with movement of the operation portion,
the swing arm elongating along a second direction orthogonal to the first direction, and the swing fulcrum, the second engaging portion, and the third engaging portion being arranged along the second direction,
a distance between the swing fulcrum and the third engaging portion is set larger than a distance between the swing fulcrum and the second engaging portion,
the swing arm displacing the body to be detected engaging with the third engaging portion in the first direction by rotating about the swing fulcrum along with tilting of the lever in the first direction, and amplifying a displacement amount of the body to be detected with respect to a displacement amount of the first engaging portion of the lever at the time of tilting,
the lever is tiltable also in the second direction due to the movement of the operation portion, and
the slider pivotally supports the swing fulcrum of the swing arm, and is displaced in the second direction together with the swing arm along with the tilting of the lever in the second direction.

2. A lever input device comprising:
a lever including an operation portion, a first engaging portion, and a pivotally supporting portion;
a swing arm including a swing fulcrum, a second engaging portion, and a third engaging portion, the swing arm engaging with the first engaging portion of the lever at the second engaging portion;
a body to be detected engaging with the swing arm at the third engaging portion of the swing arm; and
a detector arranged so as to opposedly face the body to be detected,
wherein the lever is tiltable in a first direction along with movement of the operation portion,
the swing arm elongating along a second direction orthogonal to the first direction, and the swing fulcrum, the second engaging portion, and the third engaging portion being arranged along the second direction,
a distance between the swing fulcrum and the third engaging portion is set larger than a distance between the swing fulcrum and the second engaging portion,
the swing arm displacing the body to be detected engaging with the third engaging portion in the first direction by rotating about the swing fulcrum along with tilting of the lever in the first direction, and amplifying a displacement amount of the body to be detected with respect to a displacement amount of the first engaging portion of the lever at the time of tilting,
the operation portion, the pivotally supporting portion, and the first engaging portion are arranged in order from one end of the lever, and the lever is tiltable in the first direction using the pivotally supporting portion as a tilting fulcrum, and
the pivotally supporting portion and the first engaging portion are spherical.

* * * * *